United States Patent
Irgens-Moller et al.

[11] Patent Number: 5,876,099
[45] Date of Patent: Mar. 2, 1999

[54] AXLE HUB COVER

[76] Inventors: Niels Irgens-Moller, 15547 Crestview La., Granada Hills, Calif. 91344; Russel L. Tolliver, 6929 Tahiti Dr., Cypress, Calif. 90630

[21] Appl. No.: 957,255

[22] Filed: Oct. 24, 1997

Related U.S. Application Data

[60] Provisional application No. 60/054,874 Aug. 6, 1997.

[51] Int. Cl.$^6$ ..................................................... B60B 7/14
[52] U.S. Cl. ..................................... 301/108.4; 301/37.37
[58] Field of Search ................................ 301/37.1, 37.37, 301/108.1, 108.4, 108.2

[56] References Cited

U.S. PATENT DOCUMENTS

| | | | |
|---|---|---|---|
| 715,367 | 12/1902 | Giles | 301/108.2 X |
| 1,568,707 | 1/1926 | Auld | 301/108.1 |
| 4,240,670 | 12/1980 | Zorn, et al. | 301/35.62 |
| 4,639,045 | 1/1987 | Kane | 301/37.37 |
| 5,090,777 | 2/1992 | Li | 301/37.37 |
| 5,205,616 | 4/1993 | Wright | 301/37.37 |
| 5,286,093 | 2/1994 | Wright | 301/37.37 |
| 5,358,313 | 10/1994 | Polka | 301/108.4 X |
| 5,380,070 | 1/1995 | FitzGerald | 301/108.4 X |
| 5,494,336 | 2/1996 | Russell | 301/37.37 |
| 5,676,430 | 10/1997 | Wright et al. | 301/108.4 |

FOREIGN PATENT DOCUMENTS

0490831A1  6/1992  European Pat. Off. .

OTHER PUBLICATIONS

Realwheels Cover Co., Center Mount Systems Installation of Wheels Covers . . . (RW0340, RW0510, RW6600, RWUK200, RW0511,), 4 pages, Date Unknown.

*Primary Examiner*—Russell D. Stormer
*Attorney, Agent, or Firm*—Christie, Parker & Hale, LLP

[57] ABSTRACT

The current invention comprises an axle cover which can be used on large vehicles such as semi-trucks and equivalent. The invented axle cover is secured directly to the axle itself, thereby eliminating any interaction between the axle cover and the lug nuts used to fasten and secure the wheel to the vehicle. A bracket attachment is mounted to the axle itself with the use of pre-existing axle studs and axle nuts and a body portion of the axle cover is mounted to the secured bracket attachment.

6 Claims, 8 Drawing Sheets

AXLE HUB COVER

This application claims benefit of U.S. Provisional Application No. 60/054,874 filed Aug. 6, 1997.

1. Field of the Invention

This invention relates generally to ornamental wheel accessories for vehicles such as semi-trucks, utility or recreational vehicles. More specifically, this invention relates to hub covers for use on wheels of heavy duty trucks.

2. Description of the Prior Art

Axle hub covers for vehicles have been in wide-spread use for a long time. Such devices serve a decorative or ornamental purpose by covering the aesthetically unfinished wheel. Such devices also serve a functional purpose by protecting the axle or hub from accumulated particles of debris, dust and other contaminants inherently collected as a result of driving on roads and highways.

Typically, such axle hub covers are mounted directly to the wheel by using the lug nuts that also keep the wheel secured to the axle of the vehicle; those same lug nuts also are used to hold ornamental wheel covers in place. When the need arises to examine the axle hub, the only way to gain access to the hub is to remove the hub covers and this necessarily requires loosening and removing the same lug nuts that secure the tire to the axle of the vehicle. This is undesirable because one is forced to remove the attachment instruments that keep the wheel secured to the truck when the only purpose of removing the hub cover is to examine the axle hub.

Some prior axle cover arrangements require the user to remove only some, but not all, of the lug nuts attaching the wheel to the vehicle when inspection of the hub is required. While this is preferred over the removal of the entire set of wheel lug nuts, the same basic problem remains. The user must remove the very attachments that keep the wheel secured to the vehicle when the wheel itself is irrelevant to the need to gain access to the axle hub. The continually repeated process of removing and reattaching the lug nuts can create a potentially dangerous situation when the lug nuts are not properly seated after an axle hub examination. Lug nuts may inadvertently loosen and be lost under normal road use. Yet other existing wheel or axle covers require removal of all the lug nuts for installation with necessitates jacking up the vehicle.

The rules and procedures of various governmental agencies require or provide for regular inspections of truck axle hubs, and also irregular or unscheduled inspections, in support of agency truck safety and other programs. Such agencies include the U.S. Department of Transportation and various state agencies. In addition to the other disadvantages and problems associated with the use of wheel lug nuts to secure axle hub covers in place, that use also hinders the effective application of those rules and procedures by those agencies. As a consequence, the use of ornamental axle hub covers on the wheels of heavy duty trucks has been prohibited in many jurisdictions.

It is seen, therefore, that a need exists for an ornamental axle hub cover arrangement and mounting system which avoids reliance on wheel lug nuts to secure the cover in place and which also enables the cover to be removed for inspection events without loosening or removing any nuts or other fasteners which are part of the axle and wheel structure.

SUMMARY OF THE INVENTION

The present invention addresses the need described above. It does so by providing an axle hub cover arrangement which is mounted to the hub and has no association with the wheel lug nuts. It is mounted to the hub via axle nuts but in such a way that the cover can be quickly removed from the hub without the need to touch those nuts and in a way such that the axle hub is readily inspectible.

Generally speaking, in terms of structure, this invention provides a cover assembly for a vehicle axle hub in which a hub end plate is secured by plural sets of studs and nuts in which the studs extend from the end plate near its edge. The cover assembly includes a substantially cylindrical trim sleeve which has a selected length between an open end and an opposite closed end. The sleeve has an inner diameter which is sufficient to enable the sleeve to be placed over the hub end of an axle. The assembly includes at least one sleeve mounting member which is mountable to an axle via at least one set of studs and nuts. The mounting member defines a surface which is matable with the inside of the trim sleeve between the sleeve ends. The mounting member defines at least one sleeve fastener receptacle. The assembly also includes at least one sleeve fastener which is releasably engageable in a fastener receptacle through a corresponding aperture defined in the sleeve between its ends.

BRIEF DESCRIPTION OF THE DRAWINGS

The above-mentioned and other features of presently preferred and other forms of the invention are set forth in the following detailed description presented with reference to the accompanying drawing in which.

DESCRIPTION OF THE PREFERRED EMBODIMENTS

The preferred embodiment of this invention is an axle cover 10 that will fit over the outside of the vehicle axle in a manner that allows the cover to engulf essentially the entire portion of the axle which extends beyond a wheel mounted to the axle, i.e., over the axle hub. Preferably the cover extends the entire length of an axle hub 20 from tip to base and is secured indirectly to the axle itself.

Preferably, the axle hub cover will consist of two primary pieces. The first primary piece is an essentially cylindrical bracket attachment 12 with preferably two inwardly extending flanges 22 with corresponding flange apertures 30 spaced in a manner sufficient to align the apertures 30 with corresponding axle bolts 28 when the bracket is fitted over the top of said axle hub 20. The bracket is attached directly to an end surface 36 of the hub by inserting the hub end studs (bolts) 28 through the flange apertures 30 and securing the bracket in place by threading corresponding axle hub nuts 32 onto the studs with sufficient torque to prevent an inadvertent loosening of the axle nuts 32.

The second primary piece of the axle hub cover is a substantially cylindrical hub cover 42. The hub cover 42 has a first open end 49 and a second closed dome-shaped end 64. The hub cover 42 is of sufficient diameter to fit over the axle 20 of the vehicle and of sufficient length to extend from the base of the axle hub 20 at a point close to a wheel mounted to the axle or to a trim cover mounted to such a wheel, to beyond the end surface 36 of the axle as measured from its bottom edge 48 to its top surface 64.

The bracket attachment 12 is essentially a cylindrical ring defined by an inside surface 14 and an outside surface 16. When installed, the axis 15 of the bracket attachment 12 is substantially coextensive with the axis of the vehicle axle 20. The bracket attachment 12 is further defined by a top edge 24 and a bottom edge 26. The radius of inside surface 14 is sufficiently larger than the radius of the axle hub 20 to allow the bracket attachment 12 to be fitted over the outside of the axle. Preferably two flanges 22 extend inwardly from the inner surface 14 of the bracket attachment 12 from preferably diametrically opposed positions approximately equidistant from the top edge 24 and the bottom edge 26 of the bracket attachment 12. Each flange 22, extends inwardly a length sufficient to encompass the axle studs 28. Each flange 22, has a hole 30 of sufficient diameter to receive the axle studs 28 without engaging them.

When the bracket attachment 12 is properly installed, the axis of the flange holes 30 are substantially identical to the axes of the axle studs 28. This allows the bracket attachment 12 to be directly secured to the axle 20 by temporarily removing two of the axle stud nuts 32 and the corresponding washers 34, fitting the bracket attachment 12 over the axle 20 by inserting the axle studs 28 through the flange holes 30 such that the flanges 22 directly contact the end surface 36 of the axle 20. The bracket attachment 12 is preferably permanently secured to surface 36 by re-engaging the axle stud washers 34 and the axle stud nuts onto the axle studs 28 and tightening with sufficient torque to secure the bracket attachment 12 in place.

Figure 1:
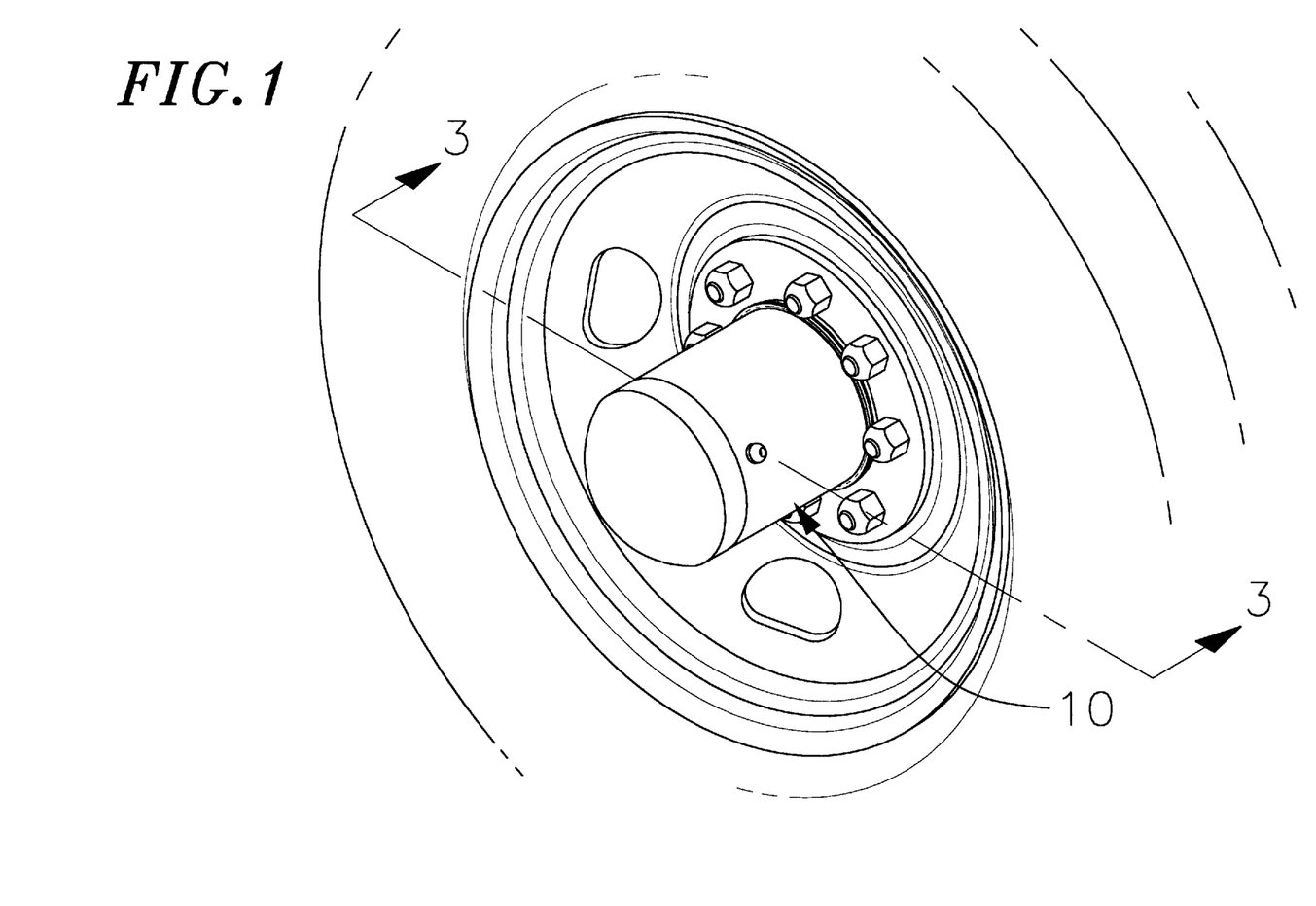
FIG. 1 is a perspective view of the axle cover, installed onto the axle of a vehicle directly adjacent to the wheel of a vehicle.
Figure 2:
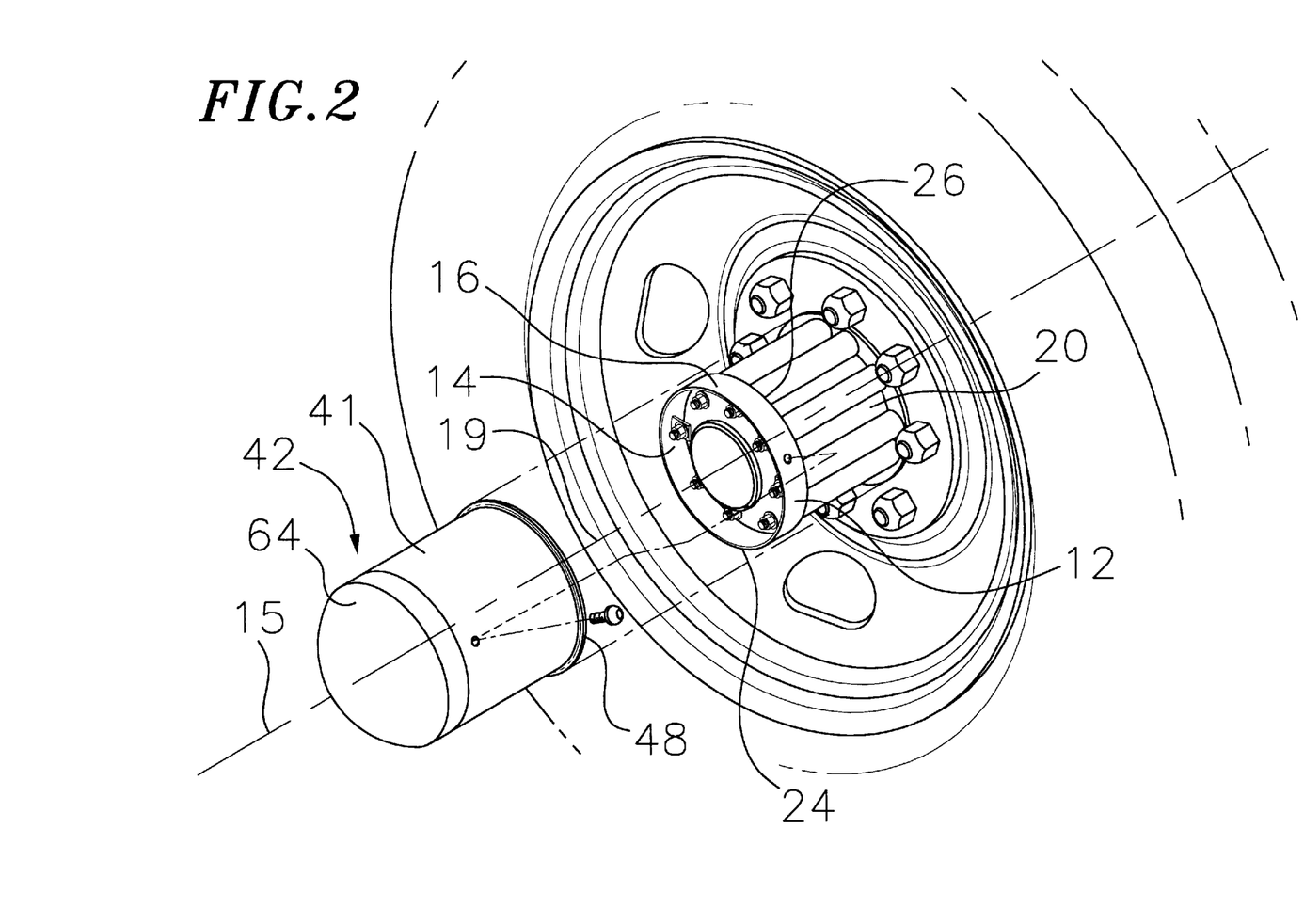
FIG. 2 is a partially exploded perspective view of the axle cover with the body portion removed and the bracket attachment secured to the axle.
Figure 3:
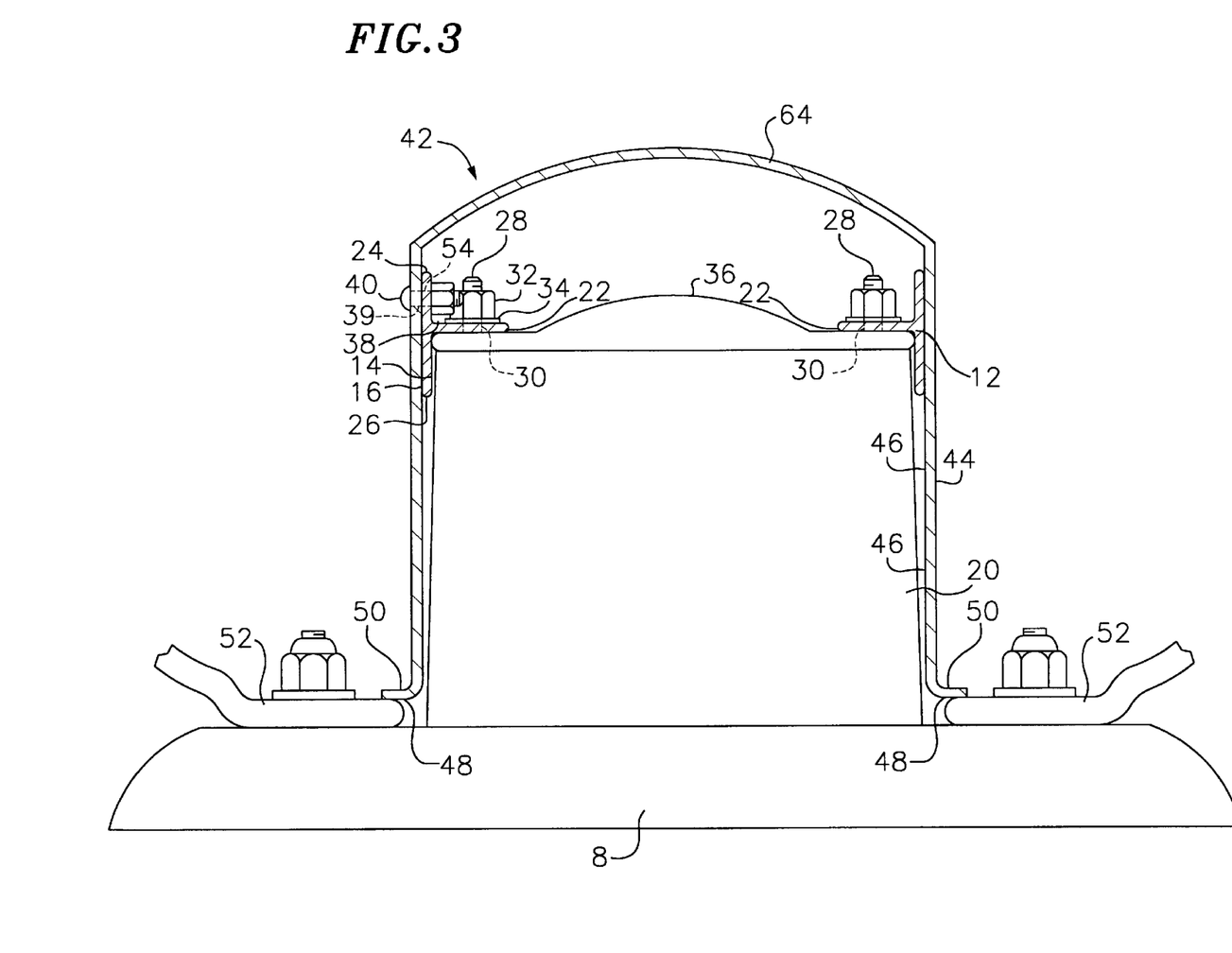
FIG. 3 is a cross section of the axle cover installed directly to the axle of the vehicle.
Figure 5:
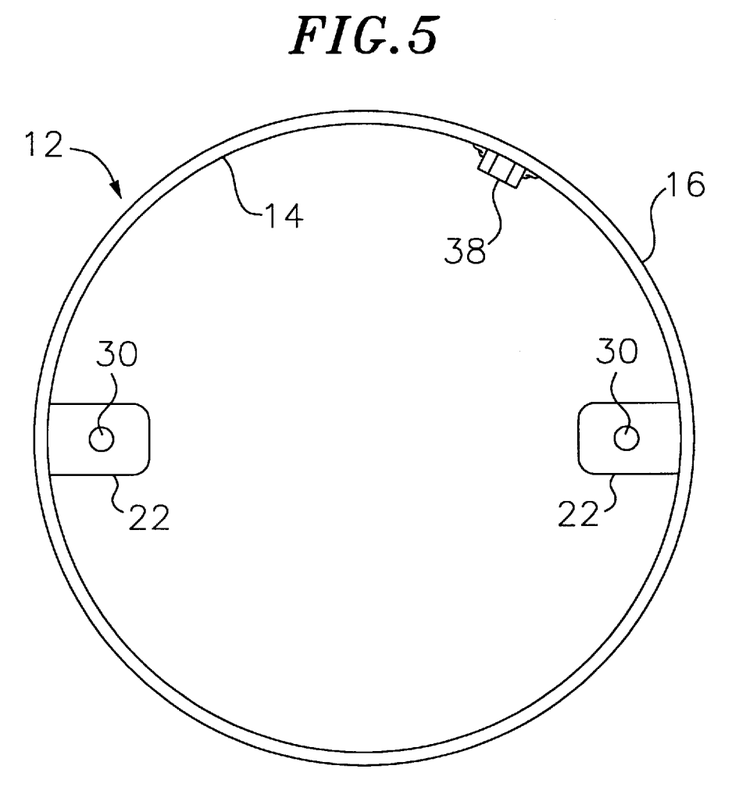
FIG. 5 is a top view of the axle cover's bracket attachment.
Figure 7:
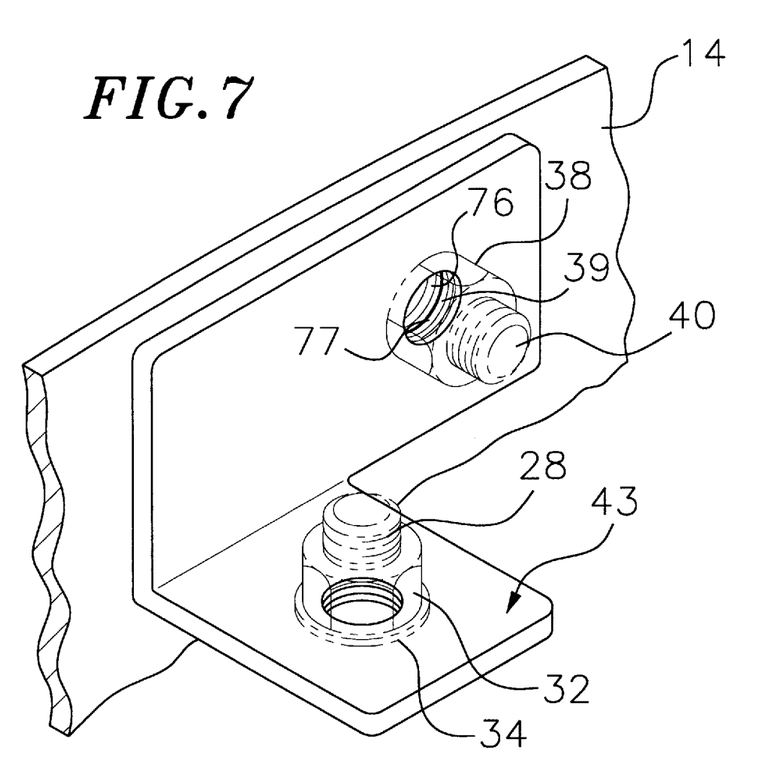
FIG. 7 is a perspective view of an alternative embodiment of the axle cover's bracket attachment.

A cover securing bracket nut 38 is preferably welded to the inside surface 14 of the bracket attachment 12 as shown in FIGS. 3 and 5. The hub cover bolt fastener 40 is designed to engageably interact with nut 38 to secure the hub cover 42 described below. Also, it is possible to secure the hub cover to the bracket attachment with a means that does not include a threaded bolt and corresponding nut (i.e. the inner edge 77 of the bracket attachment hole 39 could be threaded to engageably receive and secure bolt 40 as shown in FIG. 7).

Figure 6:
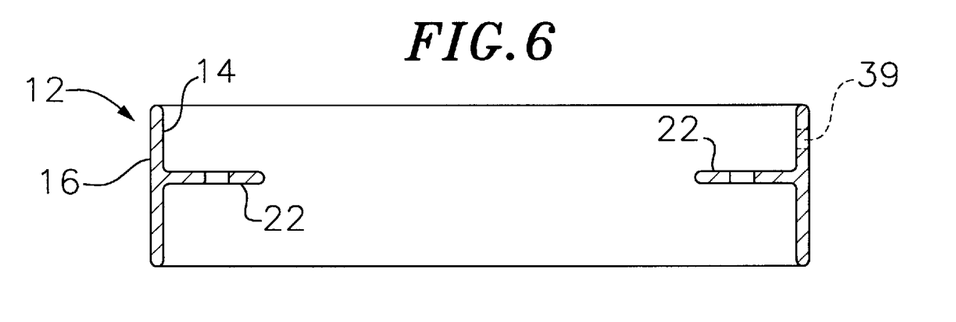
FIG. 6 is a cross section the axle cover's bracket attachment.

Although the closed ring bracket design gives the maximum support and allows one nut 38 to sufficiently secure the cover in place, an alternative embodiment of the mounting bracket member 12 is a variation that uses a structure that is not a closed ring. The mounting bracket 43 can be designed to engage only one axle stud in a manner that still aligns its fastener receptacle 39 with the sleeve receptacle 76 as shown in FIG. 7. Likewise, the mounting bracket member can be shaped in any manner that allows the mounting bracket to be secured directly to the axle via the axle studs while aligning the receptacle 39 with the sleeve receptacle. Various shapes include but are not limited to partial arcs secured to the axle by the axle studs and nuts, yet stopping short of completing the closed ring design shown in FIGS. 5 and 6.

Figure 4:
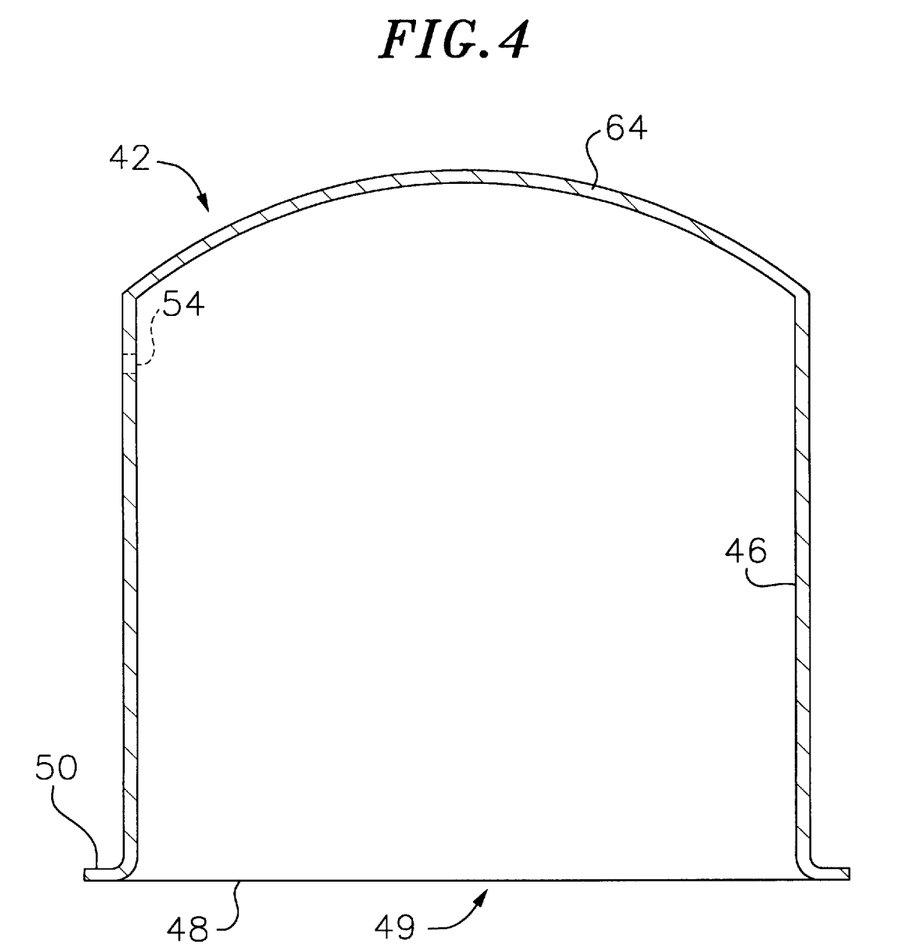
FIG. 4 is a cross sectional view of the axle cover before installation.

The second primary piece of the axle hub cover 10 is the substantially cylindrical hub cover 42 as shown in FIGS. 3 and 4. The hub cover 42 is essentially a cylinder with an outer surface 44 and an inner surface 46. The hub cover 42 is further defined by an open end 49 defined by a circular bottom edge 48 which can be outwardly flared as shown at 50. The hub cover is also defined by a closed dome-shaped end 64. Cover edge 48 can contact or be spaced closely adjacent to either a wheel 8 or a tire rim 52 for the wheel. Preferably, flared contact points 50 interact with the tire rim 52. Preferably, the hub cover 42 has a hole 54 positioned a sufficient distance from the cover bottom edge 48 such that the radial axis of the hub cover hole 54 aligns with the radial axis of the bracket attachment ring hole 39 when the cover has the desired contact with or proximity to the wheel. This allows the hub cover fastener bolt 40 to pass through both the hub cover hole 54 and the bracket attachment hole 39 to threadably engage the bracket hub cover nut fastener 38. Thus, the hub cover 42 can be secured to the bracket attachment 12 which is essentially permanently attached to the axle hub 20 by the axle stud nuts 32. The hub cover 42 can also be ornamentally fluted in a manner that results in the radius of the open end 49 of the hub being either greater than or less than the opposite closed dome-shaped end 64.

Figure 8A:
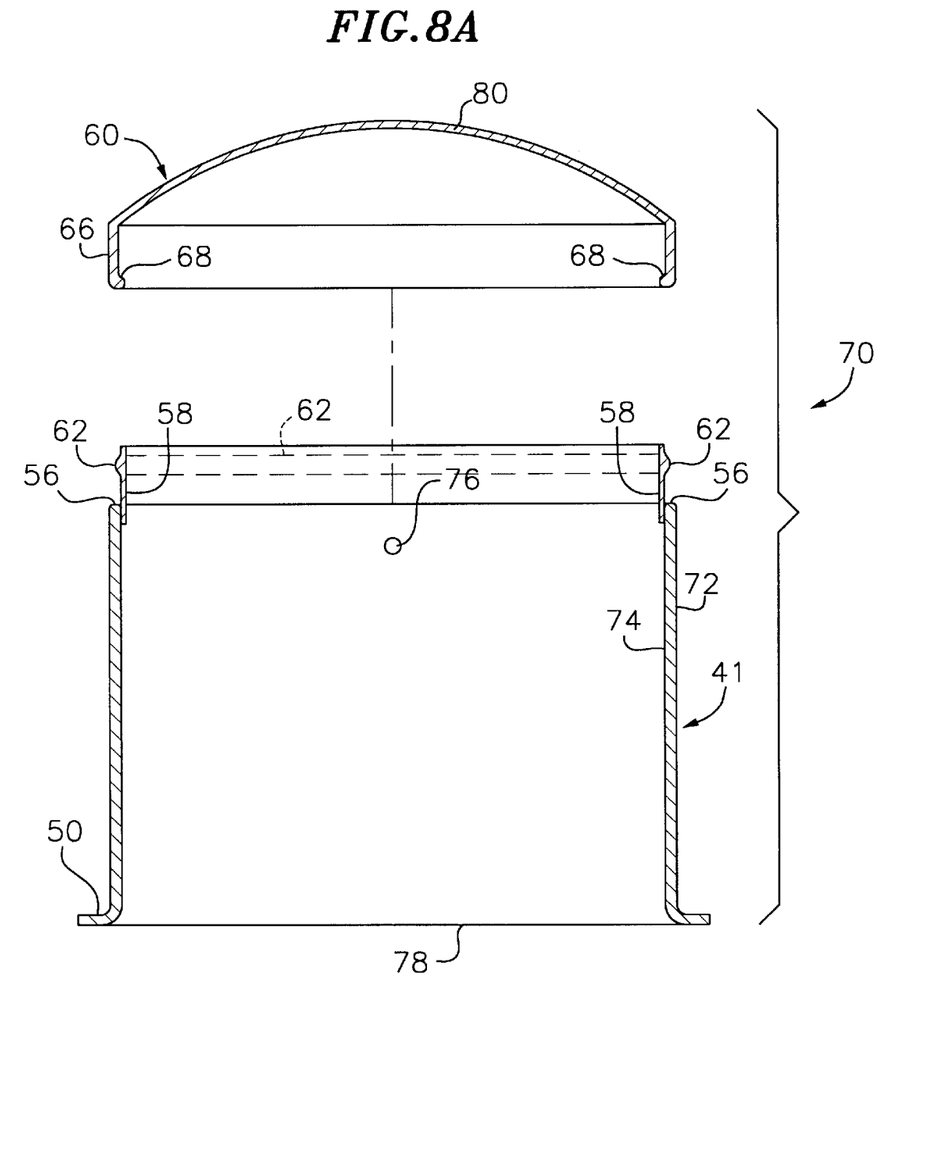
FIG. 8A is an exploded cross sectional view of the axle cover's body portion with removable end piece.

An alternative embodiment of the present invention is illustrated in FIG. 8A. In this alternative embodiment the alternative hub cover 70 has a removable lid portion 60 and an essentially cylindrical body portion 41. The removability of the lid portion 60 provides easy access to the axle hub 20 of the vehicle simply by prying off the lid portion 60 without having to remove the bolt 40 securing the body portion 41 directly to the axle. Likewise, the lid portion is easily replaced by applying sufficient pressure to force the lid portion 60 back on to the body portion of the alternative hub cover 70.

In this alternative embodiment, a top edge 56 of the body portion 41 has a circular and resiliently flexible vertical extension 58 designed to engage the removable lid portion 60 described in more detail below. The circular extension 58 is further defined by a detent 62 of sufficient size to hold the removable lid portion 60 in place, when engaged; see FIG. 8A. The body portion 41 is essentially a cylinder with an outer edge 72 and an inner edge 74. The inner edge 74 has a radius sufficiently larger than the radius of the axle hub 20 to allow the alternative two-piece hub cover 70 to slide over the outside of the axle 20 without interacting with it. The alternative hub cover 70 has a hole 76 spaced from the bottom open edge 78 of the cylinder a sufficient distance to ensure that the radial axis of hole 76 is aligned with the radial axis of the bracket attachment hole 39. This will allow the hole 76 to line up with the bracket attachment hole 39 when the bottom edge 78 of the cover 70 is interactively resting on the tire rim 52.

The removable lid portion 60 preferably has an downwardly shaped domed closed end 80 with a vertical skirt 66 with an internal lip 68 to cooperate with the circular detent 62. The detent 62 and vertical extension 58 are designed to be sufficiently flexible and resilient to bend inwardly as the lid portion is moved into place. By applying sufficient downward force on the removable lid portion 60, the circular vertical extension 58 and detent 62 are temporarily forced inward by the skirt lip 68. The vertical extension 58 springs back to its original position after the lips 68 have passed below. In this engaged position, the lip 68 interacts with the detent 62 to secure the removable lid portion in place. The removable lid portion 60 can easily be removed by prying it off with sufficient pressure to bend the vertical extension 58 inwardly a sufficient distance to disengage the detent 62 from the lip 68. The resultant hub cover is secured in place by inserting hub cover nut fastener 40 through hole 76 to threadably engage hub cover bolt fastener 38.

Figure 8B:
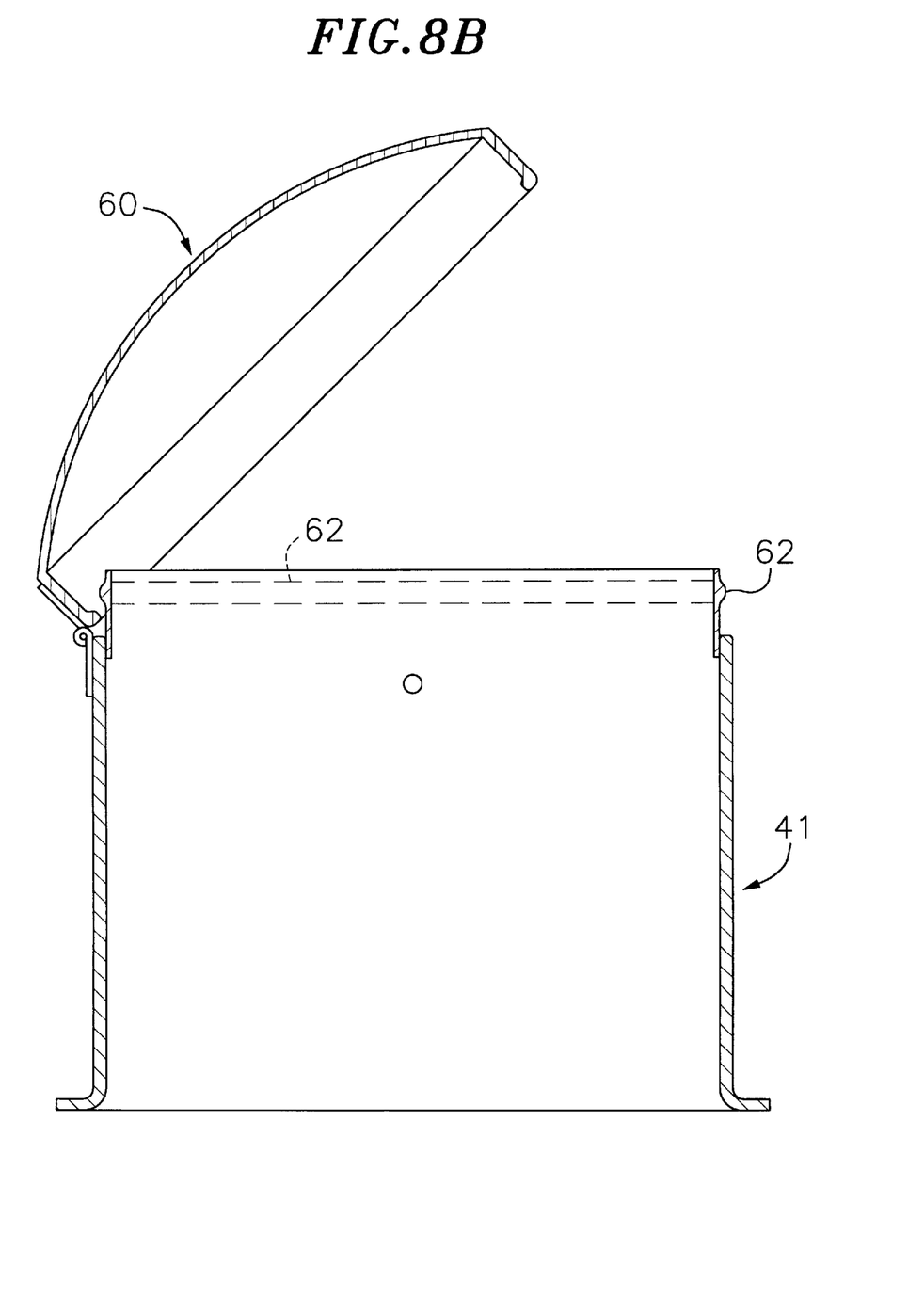
FIG. 8B is a cross sectional view of the axle cover's body portion with a partially removable end piece.

Another alternative embodiment of the present invention is illustrated in FIG. 8B. In this particular embodiment, the removable hub cover 60 is hingeably attached to the cylindrical body portion 41. Although the illustration in FIG. 8B depicts a hinged mechanism for attaching the removable hub cover 60 to the body portion, any type of connective device can be used as long as the user is allowed access to the axle within.

The present invention allows the user access to the axle of the vehicle without the need to disengage the lug nuts which hold the wheel onto the vehicle. Simply by removing bolt 40, the user can remove the axle hub cover 10 quickly and efficiently and at significantly lower cost compared to having to loosen and remove the lug nuts securing the wheel itself to the vehicle. Similarly, replacing the hub cover is as simple as placing the cover over the axle aligning the holes 54 and 39, and rethreading bolt 40. The savings in maintenance time alone is substantial.

We claim:

1. An axle end cover for a truck axle, said axle cover comprising:
    a bracket attachment, said bracket attachment comprising:
        an essentially cylindrical ring capable of fitting around an end portion of said truck axle;
        at least one flange extending radially inwardly from an inner surface of said ring;
            said flange having an aperture for receiving an axle end stud attached to
        said axle of said vehicle and to be held captive to the axle end by a nut on the stud;
        at least one securing nut attached to said inner surface of said ring;
        at least one ring hole radially aligned with said securing nut;
        a hub cover bolt engageable with each securing nut;
    a hub cover comprising:
        an open first end capable of fitting over said axle and over said bracket attachment;
        a body portion of sufficient length and shape to fit over said axle of said vehicle and defining therethrough at least one hub cover bolt hole; and
        a closed second end.

2. An axle end cover as defined in claim 1 wherein:
    said body portion of said hub cover is essentially cylindrical with a sufficient radius to fit over said axle of said vehicle;
    said closed second end of said hub cover is secured to said body portion in a releasably attachable manner.

3. An axle end cover as defined in claim 1 wherein:
    said body portion of said hub cover is essentially cylindrical with a sufficient radius to fit over said axle of said vehicle; and
    said closed second end is not removeable from cover body portion.

4. An axle cover as defined in claim 1 wherein:
    said body portion of said hub cover is essentially cylindrical with a sufficient radius to fit over said axle of said vehicle; and
    said closed second end is partially removeable from said body portion in a manner allowing access to said axle.

5. An axle cover as defined in claim 1 wherein: said hub cover comprises:
    said body portion of said hub cover is essentially cylindrical with a sufficient radius to fit over said axle of said vehicle; and
    said closed second end of said hub cover hingeably attached to said body portion.

6. An axle cover as defined in claim 1 wherein:
    said bracket attachment comprises two said inwardly radial extending flanges with two said apertures to receive two corresponding said axle studs.

* * * * *